Figures 1, 2:
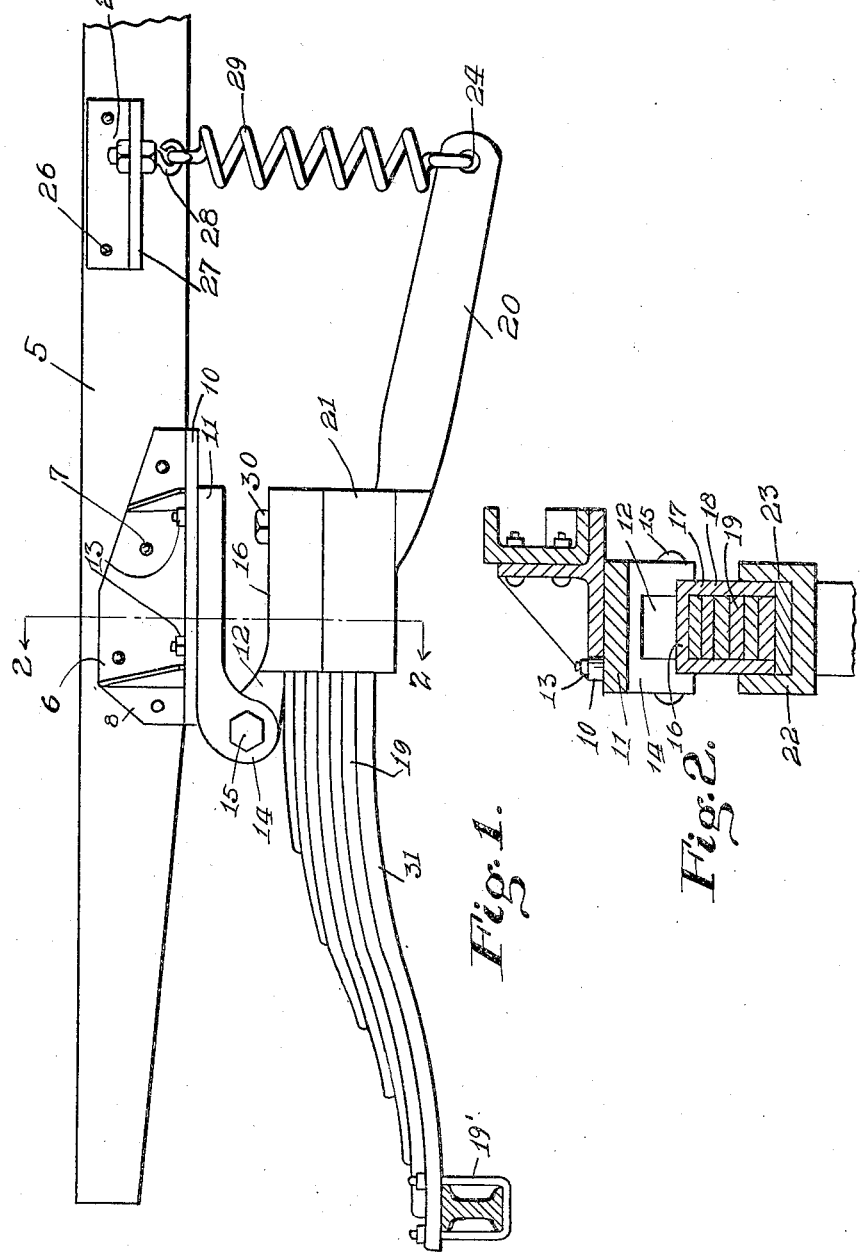

G. E. HIGGINS.
SHOCK ABSORBER.
APPLICATION FILED JAN. 26, 1920.

1,359,701.

Patented Nov. 23, 1920.

Witness

Inventor
G. E. Higgins.
By
Attorneys

UNITED STATES PATENT OFFICE.

GEORGE EDWIN HIGGINS, OF MODESTO, CALIFORNIA.

SHOCK-ABSORBER.

1,359,701.      Specification of Letters Patent.      Patented Nov. 23, 1920.

Application filed January 26, 1920. Serial No. 354,116.

*To all whom it may concern:*

Be it known that I, GEORGE EDWIN HIGGINS, a citizen of the United States, residing at Modesto, in the county of Stanislaus and State of California, have invented a new and useful Shock-Absorber, of which the following is a specification.

This invention relates to new and useful improvements in vehicle spring construction, and it is the primary object of the invention to provide novel means for automatically restricting the recoil of the leaf springs forming a part of the construction, thereby enhancing the riding qualities of the car to which the same is applied, and at the same time eliminating the possibility of the recoil breaking the spring leaves of the springs.

A further object of the invention is to provide a device of this character to permit the chassis of the car to pivot with relation to the springs, thus relieving the leaves of the springs of undue strain usually directed thereto, upon lateral movements of the car or vehicle having connection with the springs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 illustrates a side elevational view of a spring device constructed in accordance with the present invention, and Fig. 2 illustrates a sectional view taken on line 2—2 of Fig. 1.

Referring to the drawing in detail, the reference character 5 designates the rear section of one of the side members of the chassis of an automobile, which is formed in the usual manner, and has connection with the side supporting bracket 6 secured to the side member 5 by means of the bolts 7, passing through registering openings in the flange 8 of the bracket, and the side member 5, the bolts being secured in said openings by means of the nuts operating on the threaded extremities of the bolts.

This supporting bracket 6 includes a right angled portion 10 extending beyond the plane of the outer side wall of the side member 5, to provide a support for the section 11 of the hinge 12, the section 11 being secured to the right angled portion 10 by means of the bolts 13.

Forming a part of the section 11, and extending downwardly therefrom are the spaced bearings 14, apertured to receive the bolt 15, which passes through a suitable opening formed in the lower section 16 of the hinge, the lower section 16 being of a width to lie between the spaced bearings 14 to permit of movement of one section of the hinge with relation to the other, in a vertical plane, but restrict any lateral movement thereof.

The lower section 16 of the hinge forms the upper wall of the housing 17 which includes the side walls 18, housing the leaves 19, forming the main spring, these leaves being, however, formed in the usual construction, the rear thereof being provided with suitable openings to receive a clamping element 19', to permit the main spring to be secured to the axle of an automobile, or similar vehicle.

Rigidly secured to the main spring 19, is a downwardly extending arm 20, which has its spring engaging portion enlarged as at 21 and provided with integral flanges 22, and 23 extending upwardly from the opposite side thereof, the flanges being provided with openings to receive suitable securing means for securing the arm 20 to the spring housing 17, so that movement of the main spring is transmitted to the downwardly extending arm 20.

The forward end of the arm 20, is apertured as at 24, and lies directly under the bracket 25 which is bolted to the side member 5 by means of the bolt 26, the right angled portion 27 of the bracket being apertured to receive the eye bolt 28 for securing one extremity of the coiled spring 29 forming an important feature of the present invention.

This coiled spring 29 is relatively heavy, and the coils thereof are normally disposed in spaced relation with each other, to permit the spring to freely expand and contract, under the slightest movement of the chassis with relation to the main spring, the lower extremity of the coiled spring 29, being shown as extending through the aperture 24, whereby the same is secured to the arm 20.

In order that the lower section of the hinge may be rigidly secured to the main spring, the bolt 30 is provided, which bolt passes through the lower section 16 and through suitable openings in the respective leaves of the main spring, the lower extremity of the bolt extending through the relatively large leaf 31 of the main spring. From the foregoing it will be seen that due to this construction, the hinge is rigidly secured to the main spring, so that movement of the lower section of the hinge is transmitted to the main spring, but movement of the upper hinge section is compensated for, by the hinge 12.

In operation, ordinary movement of the wheels and axles of a machine equipped with a spring construction in accordance with the present invention, is taken up through the main spring, and extreme movements of one member with relation to the other, due to the automobile meeting exceptionally large obstructions, are compensated for by means of the hinge 12, the recoil being restricted by the coiled spring 29.

Having thus described the invention, what I claim as new is:—

1. In a spring construction, a fulcrum bracket, a fulcrum having connection with the bracket, a plurality of spring leaves having connection with the fulcrum, a downwardly extending arm having connection with the spring leaves, and a coiled spring having connection with the arm for restricting the recoil of the spring leaves.

2. In combination with a vehicle frame and axle, a bracket connected to the frame, a plurality of spring leaves, a hinge for connecting the spring leaves to the bracket, an arm having connection with one section of the hinge, said arm having an aperture, a coiled spring having one of its ends secured within the aperture, said coiled spring adapted to restrict the recoil of the spring leaves, and a bracket having connection with the frame for supporting the opposite end of the coiled spring.

3. In combination with a vehicle frame and axle, a bracket connected to the frame, a hinge including opposed sections, means for connecting one of the sections to the bracket, a spring including spring leaves having connection with one of the sections of the hinge, a housing embracing the leaves at one of the ends thereof, an arm having upwardly extending flanges embracing the side walls of the housing and secured thereto, a bracket secured to the frame, and a coiled spring disposed between the bracket and free end of the arm for restricting movement of the arm with relation to the frame.

In testimony that I claim the foregoing as my own, I have hereto affixed my signature in the presence of two witnesses.

GEORGE EDWIN HIGGINS.

Witnesses:
W. J. BROWN,
H. L. CHAMBERLAIN.